United States Patent

Pugnaire

[15] 3,646,809
[45] Mar. 7, 1972

[54] ADJUSTABLE TRANSDUCER OVERLOAD STOP

[72] Inventor: Jean-Pierre A. Pugnaire, Arlington, Mass.
[73] Assignee: Bytrex, Inc., Waltham, Mass.
[22] Filed: Jan. 16, 1970
[21] Appl. No.: 3,472

[52] U.S. Cl. .................................................... 73/141 A
[51] Int. Cl. .................................................... G01l 1/26
[58] Field of Search .................... 73/141 A, 398 AR, 71.2

[56] References Cited

UNITED STATES PATENTS

| | | |
|---|---|---|
| 2,741,120 | 4/1956 | Ormsby, Jr. ........................ 73/141 A |
| 3,295,086 | 12/1966 | Laimins et al. .................... 73/141 A X |
| 3,304,773 | 2/1967 | Rogallo ............................. 73/71.2 X |
| 3,315,202 | 4/1967 | Johns et al. ....................... 73/141 A X |
| 3,363,456 | 1/1968 | Laimins ............................. 73/141 A |
| 3,413,845 | 12/1968 | Pugnaire ........................... 73/141 A |

*Primary Examiner*—Charles A. Ruehl
*Attorney*—Blair, Cesari & St. Onge

[57] ABSTRACT

An overload stop for a transducer. A pin extends through and is spaced from an aperture in a load-deflectable element thereby limiting the travel of the deflectable element to the adjusted clearance between the pin and the sides of the aperture.

5 Claims, 4 Drawing Figures

PATENTED MAR 7 1972 3,646,809
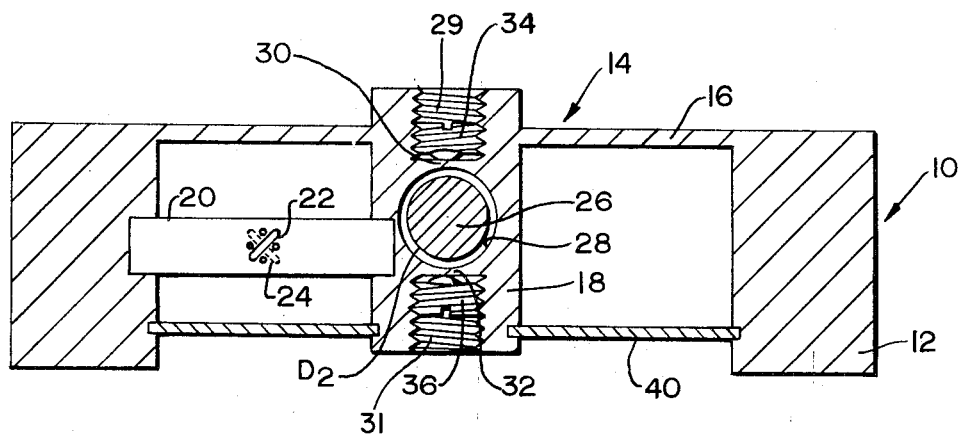
FIG. 1
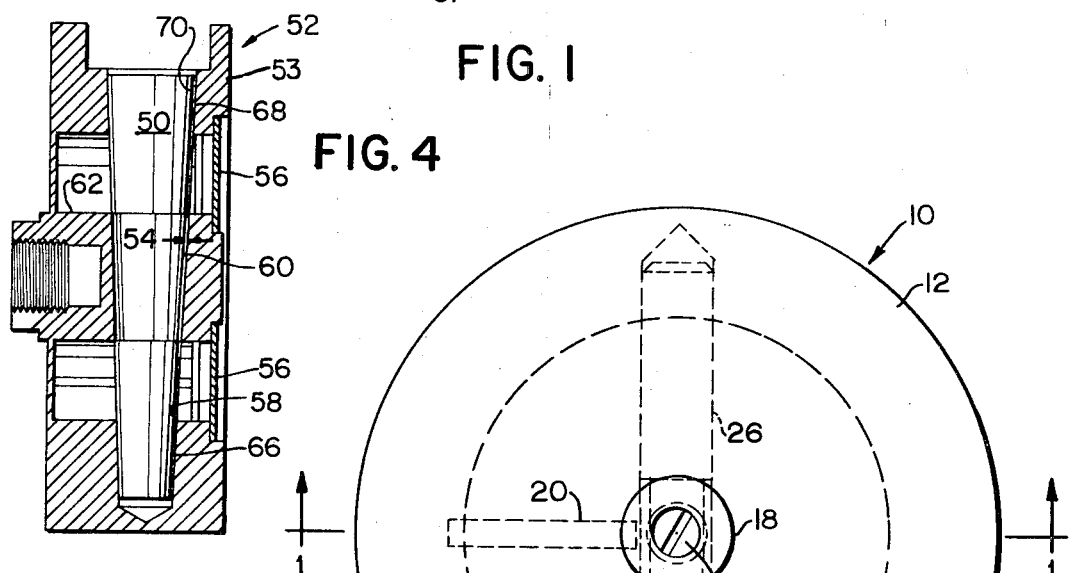
FIG. 4
FIG. 3
FIG. 2
INVENTOR
JEAN-PIERRE A. PUGNAIRE
BY
Blair Cesari & St.Onge
ATTORNEYS 3,646,809

ADJUSTABLE TRANSDUCER OVERLOAD STOP

BACKGROUND OF THE INVENTION

FIELD OF THE INVENTION

This invention relates to force and pressure transducers. More particularly, it relates to an adjustable overload stop that protects such transducers from overdeflection.

Transducers of the type with which the present invention is concerned have a deflectable element which receives a load to be measured. The deflectable element has strain gages connected thereto to convert the deflection to an electrical signal. In this way, a load in the form of a weight, fluid pressure, torque, etc., acting on the deflectable element generates a change in an electrical circuit which is indicative of the magnitude of the load. An indicator registering the output of the circuit may be calibrated to read directly in terms of force, pressure, etc.

It is generally desirable to provide a transducer with high sensitivity. However, this almost invariably results in susceptibility to overloads. This is, for high sensitivity, at least some of the elements of the transducer must be weakened, thereby limiting the range of loads that it can handle. Beyond this range, the transducer may break or, at the very least, undergo inelastic distortion which ruins its calibration. Because of the limited range of the sensitive units, it is very easy to overload them in this manner. For example, some transducers can be ruined by merely dropping a coin on them.

In the past, various load-measuring devices have been provided with overload stops to prevent damage as a result of overloading. These stops are simply strong, unyielding members positioned to prevent load-responsive deflection beyond the range of the instrument. Such arrangements have not been entirely satisfactory, particularly in very small transducers. In a small unit, it is very difficult to position a stop correctly because of the relatively small deflections involved and the correspondingly close tolerances on the deflection limits. This problem is aggravated by the fact that in a small transducer the opposing surfaces of stop and deflectable elements that engage each other under overload may be inaccessible after the transducer is assembled, particularly in a pressure transducer whose interior is sealed.

Accordingly, it is an object of the present invention to provide an improved load-measuring device or transducer that is protected from overloads.

It is another object of the invention to provide a transducer of the foregoing type which is bidirectional, that is, measures forces in opposite directions, and is protected from overloads in both directions.

A further object of the invention is to provide an overload stop arrangement for a transducer of the foregoing type which can be accurately set to prevent overloads and yet not unduly limit the operating range of the transducer.

Other objects of the invention will in part be obvious and will in part appear hereinafter.

SUMMARY OF THE INVENTION

In accordance with the invention, we provide the deflectable element of the transducer with an aperture extending transversely to the direction of deflection (herein termed the axial direction). An elongated stop member extending through the aperture is supported at its ends against movement in the axial direction. The aperture has a greater diameter that the stop member, and thus the deflectable element is free to move under deflection until the wall of the aperture engages the stop member.

The limit of deflection can be adjusted by altering the clearance between the stop member and the aperture wall. A pair of threaded bores extend through the deflectable member toward the aperture, leaving thin web sections adjacent to the aperture. Set screws are turned into the bores to distort these sections, that is, permanently deflect them inwardly toward the stop member, thereby reducing the clearance in the aperture to the desired limit of deflection.

As will be seen, this arrangement permits precise setting of the limits of deflection from the exterior of the transducer after the entire transducer has been assembled. Moreover, the adjustment feature relaxes the tolerances on the overload stop and its positioning in the transducer, thereby providing the high precision at a very reasonable cost.

BRIEF DESCRIPTION OF THE DRAWING

For a fuller understanding of the nature and objects of the invention, reference should be had to the following detailed description taken in connection with the accompanying drawing, in which:

FIG. 1 is an axial section of a transducer incorporating the invention taken along line 1—1 of FIG. 2;

FIG. 2 is a plan view of the transducer; and

FIG. 3 is a side view of an overload stop used in the transducer of FIGS. 1 and 2.

FIG. 4 is an axial section of another transducer, the view being similar to that shown in FIG. 1.

DESCRIPTION OF THE PREFERRED EMBODIMENT

As shown in FIGS. 1 and 2, a pressure transducer 10 embodying the invention comprises a cylindrical support 12 carrying a deflectable element generally indicated at 14. The element 14 includes a diaphragm 16 affixed to one end of the support 12 and preferable integral with the ring. A center post 18 which preferably is also integral with the diaphragm, is coaxial with the support 12.

A radially extending, bladelike beam 20 is rigidly connected at its ends to the support 12 and post 18, so that axial deflection of the post with respect to the support, resulting from a pressure differential across the diaphragm 16, is translated into shear strain in the beam 20. This shear strain is sensed by strain gages 22 and 24 affixed to the beam 20.

As also shown in FIGS. 1 and 2, an aperture 28 extends transversely through the post 18 to accommodate a stop-pin 26 whose ends are anchored in the support 12 against movement in the axial direction. The clearances between the pin 26 and the upper and lower wall portions of the aperture 28 (FIG. 1) determine the limits of deflection of the deflectable element 14. That is, the element 14 will deflect only until an aperture wall portion bottoms on the pin 26, at which point the relative stiffness of the pin prevents further deflection. To provide the requisite rigidity in the pin 26, I prefer that it have a relatively large diameter $D_1$ over most of its length, as shown in FIG 3, with a smaller diameter $D_2$ for clearance in the aperture 28.

With further reference to FIG. 1, the ends of the post 18 are axially bored and threaded as indicated at 29 and 31, leaving relatively thin webs 30 and 32 between the bores and the aperture 28. Set screws 34 and 36 in the bores provide for accurate setting of the deflection limits of the deflectable element 14.

More specifically, the aperture 28 is initially made somewhat oversize so that without adjustment, the deflection limits will be somewhat greater than desired. Then, the set screws 34 and 36 are turned in so that their pointed ends distort the webs 30 and 32 and, indeed, crush them somewhat so as to reduce the clearances between the webs and the stop-pin 26. These clearances are reduced so that they equal the desired maximum deflections of the element 14 in both axial directions.

The deflection limits can easily be set after the entire transducer has been assembled and even after its interior has been hermetically sealed by welding or brazing a second diaphragm 40 in place at the lower end of the post 18. (The transducer then responds to the difference in the pressures on the upper surface of the diaphragm 16 and the lower surface of the diaphragm 40.) Leads (not shown) from the strain gages 22 and 24 are connected to a load-indicating circuit and the maximum load in one direction, e.g., downward in FIG. 1, is applied to the transducer. The screw 34 is then turned in to displace the web 30 toward the pin 26 until the web just touches the pin. This can be detected by means of the indicating circuit, which at this point begins to indicate a decrease in the load sensed by the transducer. In the same manner, the screw 36 is turned upward while the transducer is subjected to a load in the opposite direction. After both the screws have thus been set, the post 18 will engage the stop-pin 26 whenever the applied load reaches the level corresponding to maximum permissible deflection of the deflectable element 14.

It should be noted that the positions of the aperture 28 and stop-pin 26 might be reversed. That is, the pin might be carried by the deflectable element 14, with the pin passing through one or more apertures fixed with respect to the support 12. Ordinarily, this alternative arrangement will not be as desirable, mainly for two reasons. In the first place, the addition of the pin to the deflectable element 14 increases the mass of that element and thereby reduces the frequency response of the transducer. Also, adjustable apertures would generally be required at both ends of the pin, thereby increasing the cost and complexity of the overload stop arrangement.

Another embodiment of the invention is shown in FIG. 4 wherein a tapered stop-pin 50 is utilized in a transducer 52. Transducer 52 comprises a fixed cylindrical support member 53 and carries deflectable metallic element 56 thereon much in the same manner that transducer 10 carries deflecting elements 16.

Stop-pin 50, comprising a tapered section 60 of reduced diameter between a tapered end section 66 and a tapered end section 68, is forced into tapered receptacle 58. Precise placement of pin 50 is controlled by the force exerted in forcing the pin into tapered receptacle 58. Reduced tapered section 60 of pin 50 registers with hub 62 of transducer 52 to provide an overload gap 54. When a tapered fit is achieved between the tapered end section 68 and a tapered segment 70 of tapered receptacle 58, a good seal is formed.

The advantage of this embodiment of the invention is that placement of stop-pin 50 is more exact and less susceptible to drift if the transducer is subjected to mechanical abuse.

It will be apparent from the foregoing that the overload stop does not require close manufacturing tolerances, indeed, quite the contrary. And, since the stop limits are set after the entire unit has been assembled, the assembly operation does not affect the accuracy of these limits. Moreover, the stop limit is easily added to existing transducer designs without an appreciable increase in cost.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawing shall be interpreted as illustrative and not in a limiting sense.

I claim:

1. In a load-sensing transducer having an element deflectable by forces being sensed by said transducer, and a fixed element, the improvement whereby said deflectable element comprises an elongate aperture formed therein which extends normal to the direction of said deflection;

an elongate stop-pin member affixed to said fixed element and extending into said elongate aperture;

the stop-pin so spaced from the wall of said aperture to determine a deflection limit for said deflectable element of the transducer;

and adjusting means, carried within said deflectable element, to adjust the space between said deflectable element and said stop-pin;

said adjusting means being so arranged to enable the adjustment to be carried out from outside the transducer.

2. The transducer of claim 1 wherein

A. said means for adjusting said space comprises a threaded bore in said deflectable element, said bore extending toward said aperture, thereby defining a relatively thin web between said bore and said aperture, said web engaging said stop pin when the allowable deflection of said transducer is reached, and B. an adjusting screw threaded in said bore, whereby said screw may be turned in toward said web to distend said web and reduce the clearance between said web and said stop-pin.

3. The transducer of claim 1 wherein said elongate stop-pin has a first tapered portion proximate one end thereof fit into a tapered receptacle formed in said fixed element.

4. The transducer of claim 3 wherein said pin is generally tapered and has a reduced section which extends into said elongate aperture, whereby the clearance between said reduced section and the wall of said aperture determines said deflection limit for said deflectable element of the transducer.

5. The transducer defined in claim 3 wherein said pin further comprises a second tapered portion proximate the other end thereof, said first and second tapered portions being fit into axially spaced segments of said tapered receptacle.

* * * * *